(12) United States Patent
Sweeney et al.

(10) Patent No.: US 10,682,592 B2
(45) Date of Patent: Jun. 16, 2020

(54) FILTER SYSTEM WITH INTEGRAL MEDIA RETAINER SEAL

(71) Applicant: Xylem Water Solutions Zelienople LLC, Zelienople, PA (US)

(72) Inventors: Howard James Sweeney, McDonald, PA (US); Brian James Bates, Bridgenorth (CA)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 149 days.

(21) Appl. No.: 15/720,532

(22) Filed: Sep. 29, 2017

(65) Prior Publication Data

US 2018/0021702 A1 Jan. 25, 2018

Related U.S. Application Data

(62) Division of application No. 14/026,526, filed on Sep. 13, 2013, now abandoned.

(60) Provisional application No. 61/701,254, filed on Sep. 14, 2012.

(51) Int. Cl.
*B01D 24/24* (2006.01)
(52) U.S. Cl.
CPC .......... *B01D 24/24* (2013.01); *B01D 2201/34* (2013.01); *B01D 2201/342* (2013.01)
(58) Field of Classification Search
CPC ................ B01D 24/24; B01D 2201/34; B01D 2201/342
See application file for complete search history.

(56) References Cited

U.S. PATENT DOCUMENTS

| 2,716,490 A | 8/1955 | Barstow |
| 4,464,260 A | 8/1984 | Duneau |
| 4,619,765 A | 10/1986 | Roberts |
| 5,068,033 A | 11/1991 | Tobias et al. |
| 5,149,427 A | 9/1992 | Brown et al. |
| 5,167,840 A | 12/1992 | Jaccarino |
| 5,259,953 A | 11/1993 | Baracchi et al. |
| 5,269,920 A | 12/1993 | Brown et al. |
| 5,393,425 A | 2/1995 | Cobb, Jr. |
| 5,489,388 A | 2/1996 | Brown et al. |
| 5,618,248 A | 4/1997 | Huang |

(Continued)

FOREIGN PATENT DOCUMENTS

| CN | 2216855 Y | 1/1996 |
| CN | 1183736 A | 6/1998 |

(Continued)

*Primary Examiner* — Matthew O Savage
(74) *Attorney, Agent, or Firm* — The Webb Law Firm (57) ABSTRACT

A filter system having a filter media retainer seal includes: at least one underdrain block having a top wall, a bottom wall, and a pair of side walls extending between the top wall and the bottom wall; a filter media retainer mounted onto the top wall of the at least one underdrain block; and at least one rib positioned between the underdrain block and the filter media retainer. The at least one rib forms a seal between the underdrain block and the filter media retainer, and prevents filter media from entering the underdrain block. The at least one rib can be monolithically formed to the at least one underdrain block. Alternatively, the at least one rib is monolithically formed to the filter media retainer. The rib is crushable and/or it bites into a surface on the adjoining part to reduce or eliminate the need for a separate sealant.

4 Claims, 8 Drawing Sheets

(56) References Cited

U.S. PATENT DOCUMENTS

| | | | |
|---|---|---|---|
| 5,639,384 | A | 6/1997 | Brown et al. |
| 5,865,999 | A | 2/1999 | Shea et al. |
| 6,325,931 | B1 | 12/2001 | Roberts et al. |
| 6,740,237 | B1 | 5/2004 | Roberts et al. |
| 6,982,034 | B2 | 1/2006 | Roberts et al. |
| 6,989,096 | B2 | 1/2006 | Roberts et al. |
| 6,991,723 | B2 | 1/2006 | Roberts et al. |
| 6,991,726 | B2 | 1/2006 | St. Germain |
| 7,288,193 | B2 | 10/2007 | Roberts et al. |
| 8,052,871 | B2 | 11/2011 | Roberts et al. |
| 8,069,630 | B2 | 12/2011 | Slack et al. |
| 8,070,946 | B2 | 12/2011 | Roberts et al. |
| 8,177,970 | B2 | 5/2012 | Bradley et al. |
| 8,388,841 | B2 | 3/2013 | Moretto |
| 2002/0096463 | A1 | 7/2002 | Roberts et al. |
| 2004/0009580 | A1 | 1/2004 | Lynch et al. |
| 2005/0133434 | A1 | 6/2005 | Hambley et al. |
| 2006/0060532 | A1 | 3/2006 | Davis |
| 2006/0118473 | A1 | 6/2006 | Roberts et al. |
| 2011/0073549 | A1 | 3/2011 | Geibel et al. |
| 2014/0021121 | A1 | 1/2014 | Ball et al. |

FOREIGN PATENT DOCUMENTS

| | | |
|---|---|---|
| CN | 1413757 A | 4/2003 |
| WO | 9700110 A1 | 1/1997 |
| WO | 9915254 A1 | 4/1999 |
| WO | 0110531 A1 | 2/2001 |
| WO | 2010121827 A1 | 10/2010 |
| WO | 2012027743 A2 | 3/2012 |

FILTER SYSTEM WITH INTEGRAL MEDIA RETAINER SEAL

CROSS REFERENCE TO RELATED APPLICATIONS

This application is a divisional of U.S. application Ser. No. 14/026,526, filed on Sep. 13, 2013, which claims the benefit of U.S. Provisional Application No. 61/701,254, filed on Sep. 14, 2012, both of which are hereby incorporated by reference in their entireties.

BACKGROUND OF THE INVENTION

Field of the Invention

The present disclosure relates generally to a filter system for filtering a liquid containing particles, and, in particular, to a filter system that includes an integral media retainer seal.

Description of Related Art

Gravity filters are used to separate water from suspended solids. The main components of gravity filters are filtering media and underdrain blocks. Underdrain blocks are generally square or rectangular in cross section and have a long longitudinal axis as compared to their cross section. They are attached end-to-end to form long sections called laterals. When using a mono-pour installation method, underdrain laterals are attached to the filter floor using a series of anchor rods, horizontal supports, and grouting.

The filtering media is used to capture dirt particles from a liquid being filtered as the liquid passes through the media. The filter media is supported by a filter media retainer so that it will not pass into the underdrain block or collection system. The filter media retainer is often a plate or plurality of plates that are placed on top of the underdrain block. To further prevent filter media from passing into the underdrain block, a sealant is inserted between the filter media retainer and underdrain block.

Typically, the sealant inserted between the filter media retainer and underdrain block is caulk, high tack synthetic rubber tape, and the like. However, these sealants have several drawbacks. For instance, these sealants are expensive, and it is time-consuming to apply them during assembly of the filter system. In addition, an incomplete sealing arrangement around the top of the underdrain block can allow filter media to pass into the underdrain block after multiple uses.

In view of the foregoing, a need exists for a filter system that includes an integrated structural component that is capable of forming a seal between the filter media retainer and underdrain block.

SUMMARY OF THE INVENTION

In one non-limiting embodiment, the present invention relates to an underdrain block for a filter system. The underdrain block includes a top wall, a bottom wall, a pair of side walls extending between the top wall and the bottom wall, and at least one crushable rib that is monolithically formed to the top wall of the underdrain block. The rib projects out from the top wall of the underdrain block at a height ranging from 0.01 inches to 0.05 inches, and has a width ranging from 0.01 inches to 0.05 inches. The rib can also be formed into a variety of shapes including a triangular shape.

The underdrain block can have only one rib or it can have a plurality of ribs projecting out from the top wall. When the underdrain block includes a plurality of ribs, the plurality of ribs can project out from the top wall at different heights ranging from 0.01 inches to 0.05 inches. The rib or ribs can include an intermittent rib, a continuous rib, combinations of intermittent ribs, combinations of continuous ribs, or combinations of intermittent and continuous ribs in a pattern either single or in parallel or a series of parallel configurations. In one embodiment, the rib or ribs can extend continuously around a perimeter of the top wall of the underdrain block. Further, the underdrain block, including the crushable rib monolithically formed thereto, can be made of a variety of materials such as high density polyethylene.

The underdrain block can also have a rail that extends along at least one side of the top wall of the underdrain block. The rail can project out of the top wall of the underdrain block in a direction opposite the bottom wall. In one embodiment, the rail is positioned outside the crushable rib and extends along at least one outer side edge of the top wall of the underdrain block. In this embodiment, the rail can act as a protective barrier for the crushable rib.

In another non-limiting embodiment, the crushable rib is formed directly to an inside wall of the rail instead of the top wall of the underdrain block. The rib can be monolithically formed to the rail. The rib projects out from the inside wall of the rail in the same manner that the rib can project out from the top wall of the underdrain block described above.

The present invention also relates to a filter media retainer. The filter media retainer includes a top surface, a bottom surface, and at least one rib projecting out from the bottom surface. The at least one rib can be monolithically formed to the bottom surface of the filter media retainer. The at least one rib can project out from the bottom surface of the filter media retainer at a height ranging from 0.01 inches to 0.05 inches.

In one embodiment according to the present invention, the filter media retainer includes a plurality of ribs projecting out from the bottom surface. The plurality of ribs projecting out from the bottom surface can have different heights ranging from 0.01 inches to 0.05 inches. The rib or ribs can include an intermittent rib, a continuous rib, combinations of intermittent ribs, combinations of continuous ribs, or combinations of intermittent and continuous ribs in a pattern either single or in parallel or a series of parallel configurations. In a non-limiting embodiment, the at least one rib extends continuously around a perimeter of the bottom surface of the filter media retainer. The filter media retainer can be made of a high strength plastic including, but not limited to, acrylonitrile butadiene styrene (ABS), glass filled ABS, and blends of polyphenylene oxide and polystyrene.

The present invention also relates to a filter system that includes a filter media retainer seal. The filter system can include: at least one underdrain block having a top wall, a bottom wall, and a pair of side walls extending between the top wall and the bottom wall; a filter media retainer mounted onto the top wall of the at least one underdrain block; and at least one rib positioned between the underdrain block and the filter media retainer. The at least one rib forms a seal between the underdrain block and the filter media retainer, and prevents filter media from passing into the underdrain block. The at least one rib can be monolithically formed to the underdrain block. When the filter media retainer is mounted onto the underdrain block, the at least one rib collapses. In another embodiment, the at least one rib is monolithically formed to the filter media retainer, and when the filter media retainer is mounted to the underdrain block, the at least one rib bites into the underdrain block.

DETAILED DESCRIPTION OF THE INVENTION

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
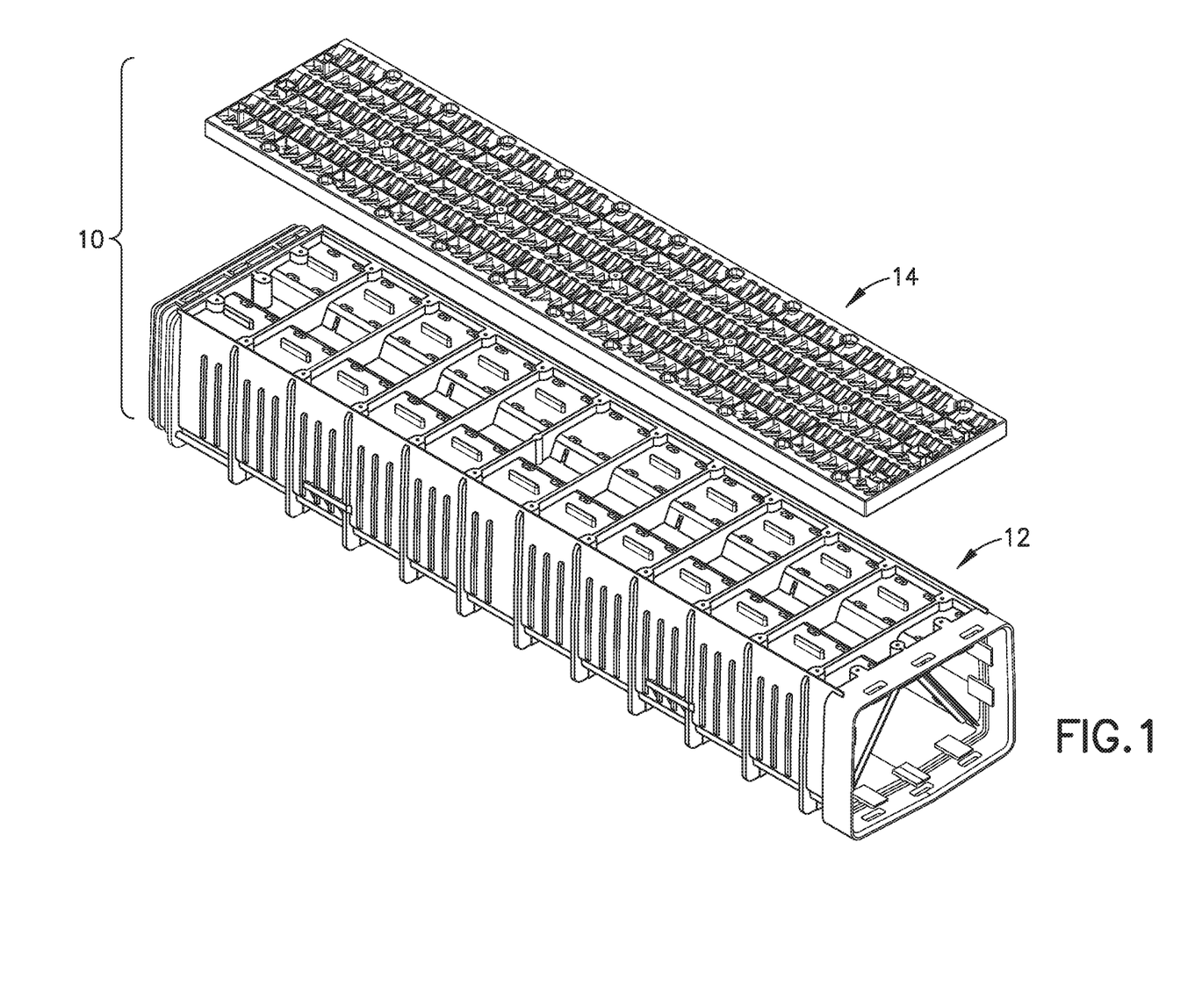
FIG. 1 is a perspective view of an underdrain block and a filter media retainer in accordance with the present invention.

Referring to FIG. 1, a gravity or pressure filter system 10 in accordance with the present invention includes at least one underdrain block 12 and a filter media retainer 14 which is mounted on top of the underdrain block 12. A layer or multiple layers of filter media (not shown) is poured on top of the filter media retainer 14. As described above, the filter media acts to remove undesirable particles from a liquid that is being filtered through the filter system 10.

Figure 2:
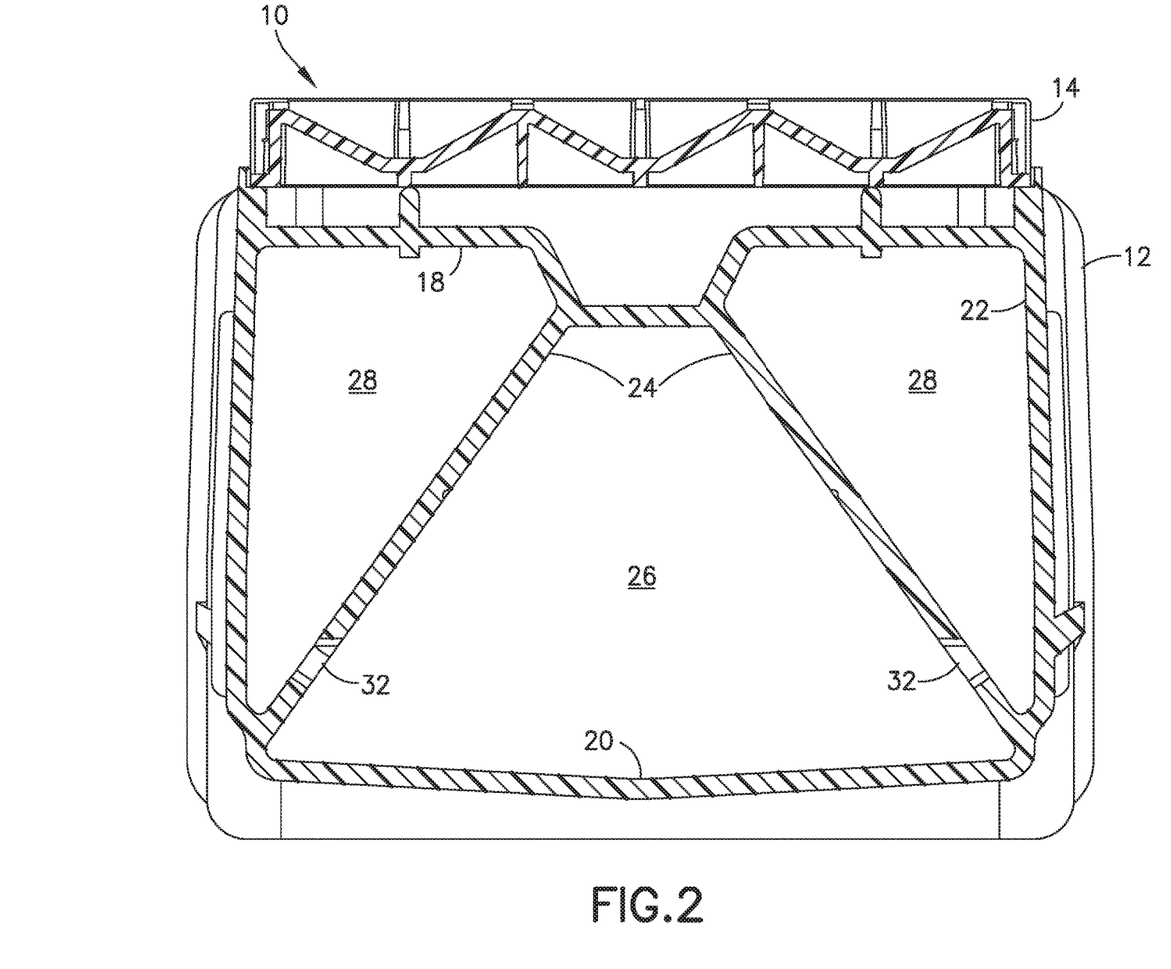
FIG. 2 is a cross-sectional view of the underdrain block and filter media retainer of FIG. 1.

As shown in FIG. 2, the underdrain block 12 has a plurality of exterior walls including a top wall 18, a bottom wall 20, and a pair of side walls 22 extending between the top wall 18 and the bottom wall 20. A plurality of internal walls 24 divide the hollow interior of the underdrain block 12 into a primary horizontal conduit 26 and two secondary horizontal conduits 28 positioned on opposite sides of primary horizontal conduit 26. Additionally, a plurality of channels 32 are provided on internal walls 24 to provide fluid communication between primary horizontal conduit 26 and secondary horizontal conduits 28.

The underdrain block 12 can be made from structural foam including, but not limited to, high density polyethylene (HDPE). HDPE provides structural strength as well as corrosion resistance. Other structural foams that can be used include, but are not limited to, low density polyethylene (LDPE) and polyvinyl chloride (PVC).

Figure 3:
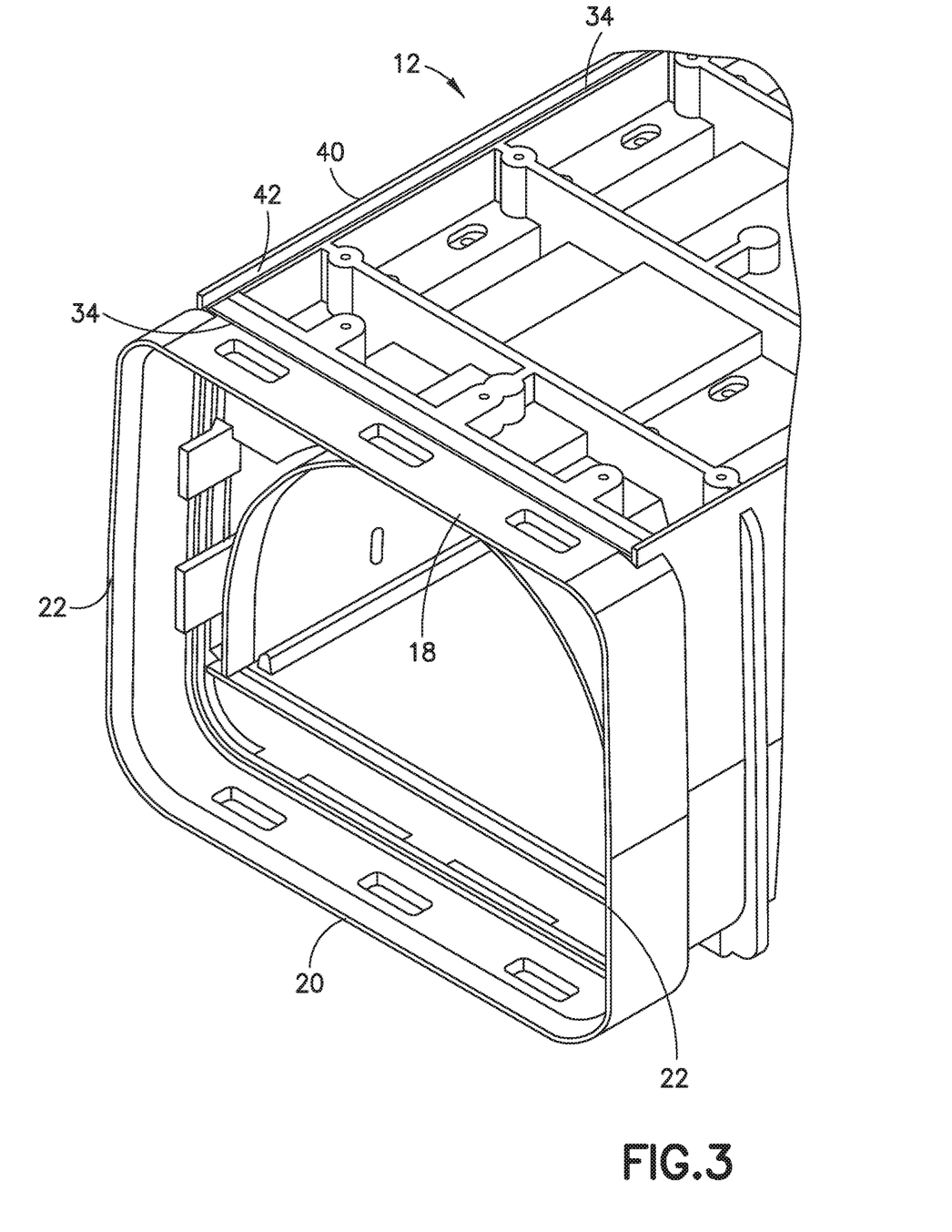
FIG. 3 is a detailed perspective view of an underdrain block showing a rib in accordance with a first embodiment of the present invention.
Figure 4A:
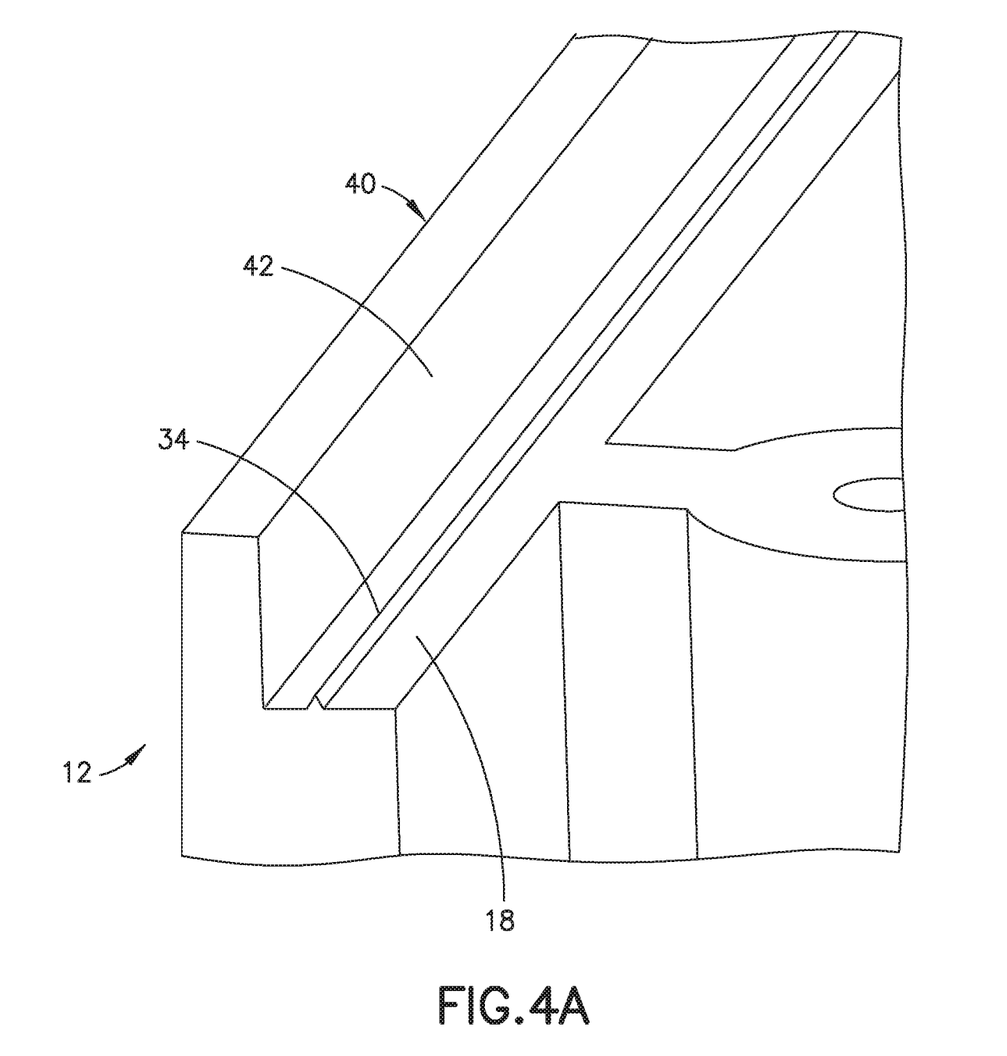
FIG. 4A is a detailed perspective view of the underdrain block of FIG. 3.
Figure 5:
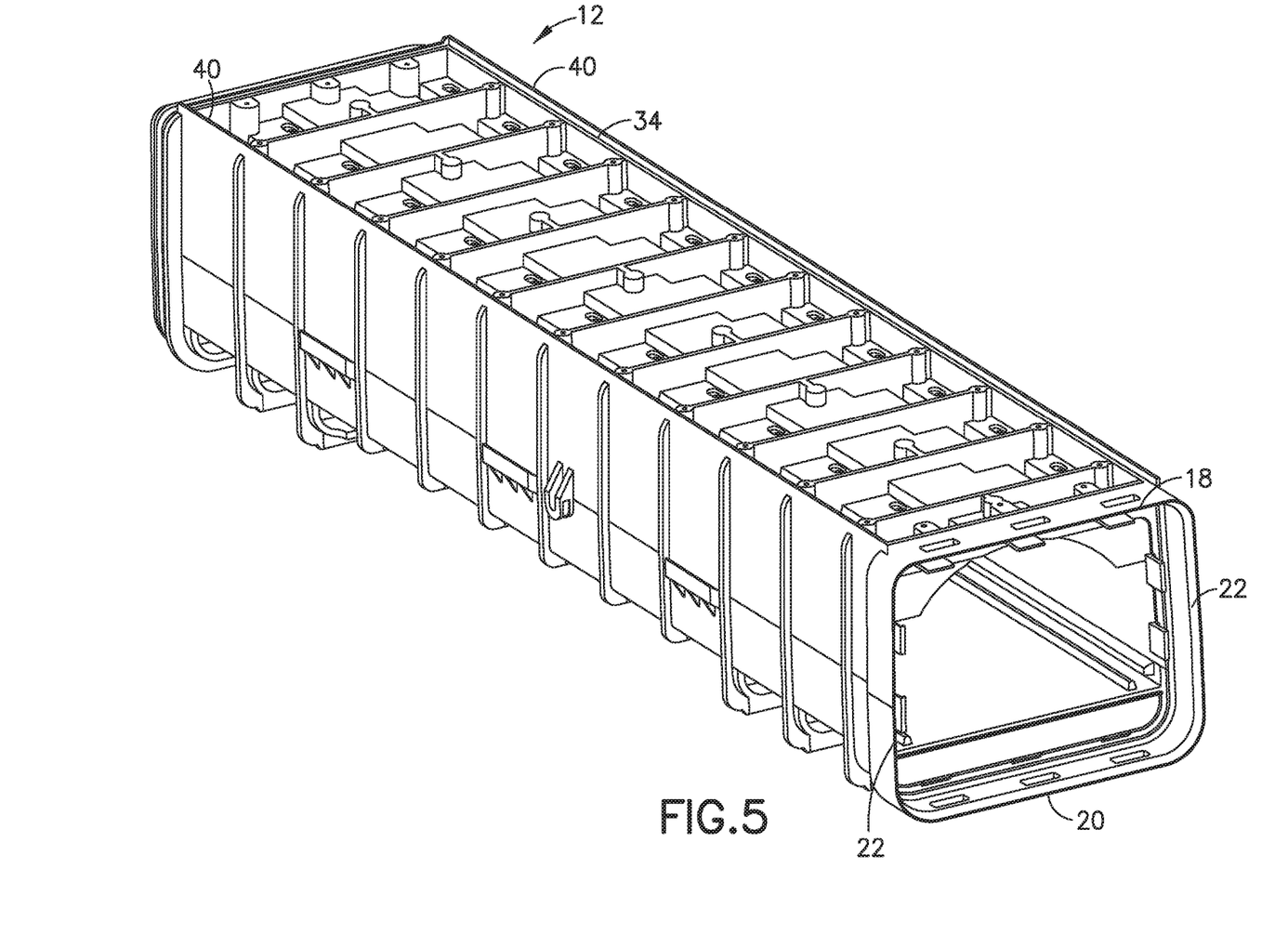
FIG. 5 is a perspective view of the underdrain block of FIG. 3.

In accordance with one embodiment of the present invention, and as shown in FIGS. 3-5, the underdrain block 12 can include a rib 34. The rib 34 can be monolithically formed to the top wall 18 of the underdrain block 12, as shown in FIGS. 3, 4A, and 5. As used herein, "monolithically formed" refers to components or structures that are formed or cast as a single piece. Accordingly, a rib 34 that is monolithically formed into the top wall 18 of an underdrain block 12 refers to an underdrain block 12 that is cast with a rib 34 projecting from the top wall 18 of the underdrain block 12. For instance, in one embodiment, a rib 34 is monolithically formed on the top wall 18 of an underdrain block 12 during the manufacturing of the underdrain block 12.

The rib 34 formed on the top wall 18 of the underdrain block 12 can project out from the top wall 18 from about 0.01 inches to about 0.05 inches. Similarly, the width of the rib 34 can range from about 0.01 inches to about 0.05 inches. In addition, the rib 34 can be formed into a variety of shapes. For instance, and as shown in FIG. 4A, the rib 34 can have a triangular shape.

In a non-limiting embodiment, the underdrain block 12 includes a plurality of ribs 34 projecting out of the top wall 18. The plurality of ribs 34 can extend around a portion of the perimeter of the top wall 18 of the underdrain block 12, or the plurality of ribs 34 can extend around the entire outer perimeter of the top wall 18 of the underdrain block 12. The plurality of ribs 34 can be aligned in a consecutive row. The plurality of ribs 34 can be a combination of intermittent ribs 34 and can be spaced apart. Alternatively, the consecutively aligned plurality of ribs 34 can be positioned such that each rib 34 abuts the next consecutive rib 34. In this embodiment, the consecutively aligned plurality of ribs 34 can form a substantially continuous barrier. In some embodiments, the plurality of ribs 34 includes combinations of continuously aligned ribs 34. Further, in certain embodiments, the plurality of ribs 34 includes a combination of intermittent and continuous sets of ribs 34. The plurality of ribs 34 can be formed in a pattern such as a single or in parallel or series of parallel configurations. The plurality of ribs 34 can project out from the top wall 18 at the same height or at different heights ranging from 0.01 inches to 0.05 inches.

In another embodiment, the underdrain block 12 includes one rib 34 with a length that extends around a portion of the perimeter of the top wall 18. As shown in FIG. 5, the underdrain block 12 can also include a rib 34 with a length that extends around the entire perimeter of the top wall 18, thereby forming a continuous wall around the perimeter of the top wall 18.

The rib 34 can be made of the same material as the underdrain block 12. For instance, both the underdrain block 12 and the rib 34 can be made of HDPE. Typically, when the rib 34 is monolithically formed on the top wall 18 of the underdrain block 12, the rib 34 and the underdrain block 12 are made of the same material. In another non-limiting embodiment, the underdrain block 12 and rib 34 are made of different materials.

Figure 4B:
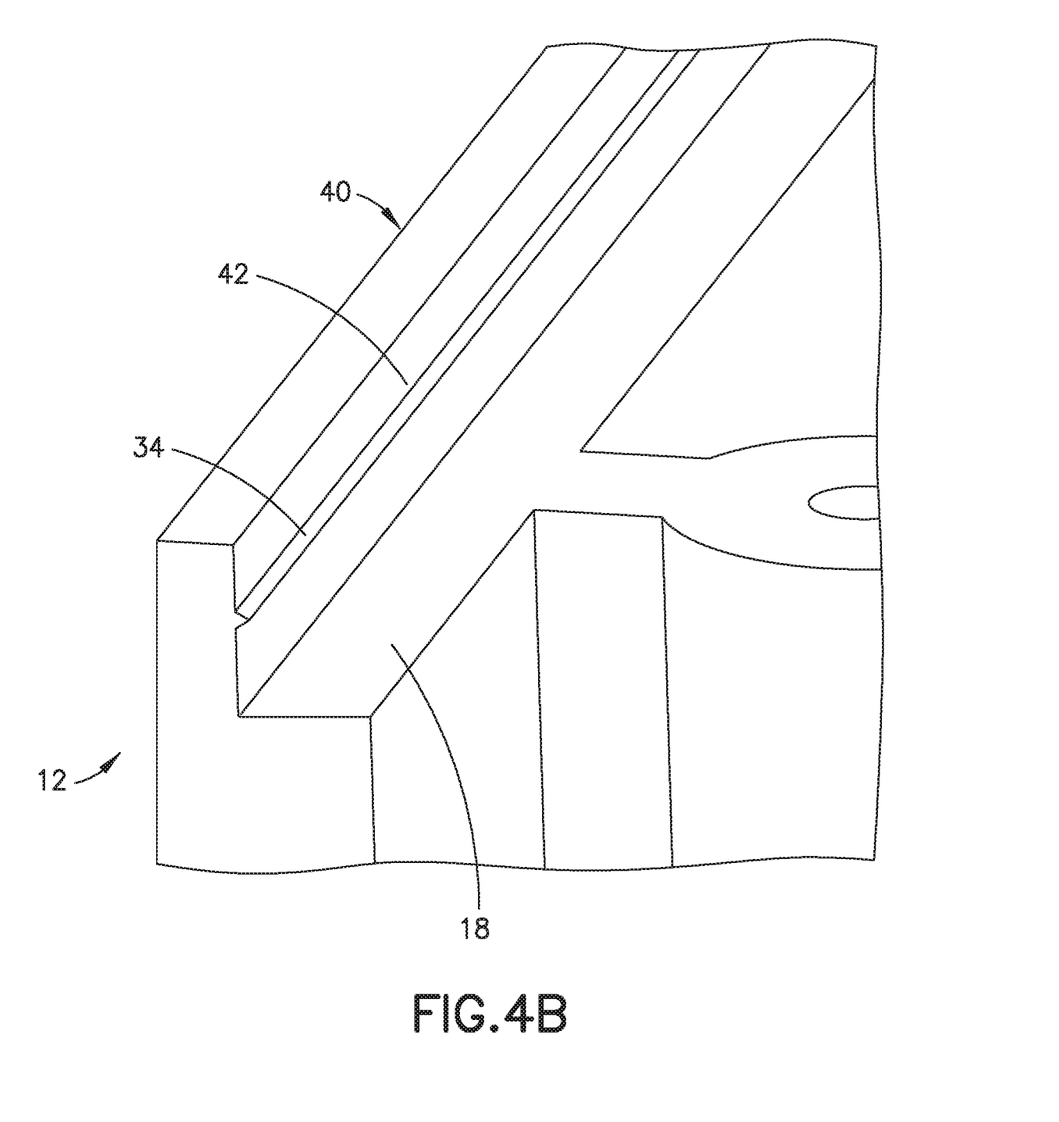
FIG. 4B is a detailed perspective view of an underdrain block with a rib in accordance with a second embodiment of the present invention.

Referring to FIGS. 3-5, the underdrain block 12 can also include a rail 40 that projects substantially out from the top wall 18 in a direction opposite the bottom wall 20. The rail 40 can be monolithically formed with the underdrain block 12. The height of the rail 40 projecting out from the top wall 18 ranges from 0.15 inches to about 0.50 inches. The length of the rail 40 extends along a portion of at least one side of the top wall 18. In one embodiment, the rail 40 is positioned outside the rib 34 and extends along at least one outer side edge of the top wall 18 of the underdrain block 12 that is adjacent and connected to a side wall 22 of the underdrain block 12. This forms a barrier along at least one outer side edge of the top wall 18. In a non-limiting embodiment shown in FIG. 5, the underdrain block 12 includes two rails 40 that extend along the entire outer side edges of the top wall 18. The two rails 40 provide a protective barrier for the rib 34 formed on the top wall 18. This prevents objects from damaging the rib 34 prior to assembling the filter system 10.

In a non-limiting embodiment, as shown in FIG. 4B, the rib 34 is formed directly to an inside wall 42 of the rail 40 instead of the top wall 18 of the underdrain block 12. The rib 34 can be monolithically formed to the rail 40. The rib 34 projects out from the inside wall 42 of the rail 40 in the same manner that the rib 34 projects out from the top wall 18 of the underdrain block 12 described above. Accordingly, the rib 34 formed to the inside wall 42 of the rail 40 can project out from the rail 40 about 0.01 inches to about 0.05 inches. Similarly, the width of the rib 34 can range from about 0.01 inches to about 0.05 inches. In addition, the rib 34 can be formed into a variety of shapes.

After the rib 34 and underdrain block 12 are formed, a filter media retainer 14 can be mounted onto the top wall 18 of the underdrain block 12. The filter media retainer 14 can be made of a high strength plastic including, but not limited to, ABS, glass filled ABS, and blends of polyphenylene oxide and polystyrene such as the plastic product sold commercially by the Saudi Basic Industries Corporation under the tradename NORYL®. The filter media retainer 14 is shaped and configured to fixedly engage with the underdrain block 12 when mounted onto the underdrain block 12. In one embodiment, the filter media retainer 14 is fastened to the top of the underdrain block 12. For instance, the underdrain block 12 can include mounting holes positioned on the top wall 18 and the filter media retainer 14 can include fasteners that are adapted to attach to the mounting holes. In one embodiment, the filter media retainer 14 is fastened into the top of the underdrain block 12 with fasteners including, but not limited to, screws.

As shown in FIG. 1, the filter media retainer 14 can include a filter media retainer plate or a plurality of connected plates that are interconnected to form the filter media retainer 14. Such a filter media retainer 14 is described in U.S. patent application Ser. No. 13/553,897, the entire disclosure of which is hereby expressly incorporated herein by reference.

When mounted onto the underdrain block 12, the filter media retainer 14 engages the rib 34 projecting from the top wall 18 of the underdrain block 12. Alternatively, in another embodiment, the filter media retainer 14 engages the rib 34 projecting out from an inside wall 42 of the rail 40. The engagement between the filter media retainer 14 and the rib 34 creates a seal between the underdrain block 12 and the filter media retainer 14, which prevents filter media from entering the underdrain block 12.

In a non-limiting embodiment, the filter media retainer 14 is made of a harder material than the rib 34. For instance, the rib 34 can be made of HDPE and the filter media retainer 14 can be made of ABS. When a filter media retainer 14 made of ABS or a similar material is mounted and fastened onto an underdrain block 12 that includes a rib 34 made of HDPE, the rib 34 will collapse or crush from the force applied by the filter media retainer 14. The crushed rib 34 creates the seal between the filter media retainer 14 and the underdrain block 12.

Figure 6:
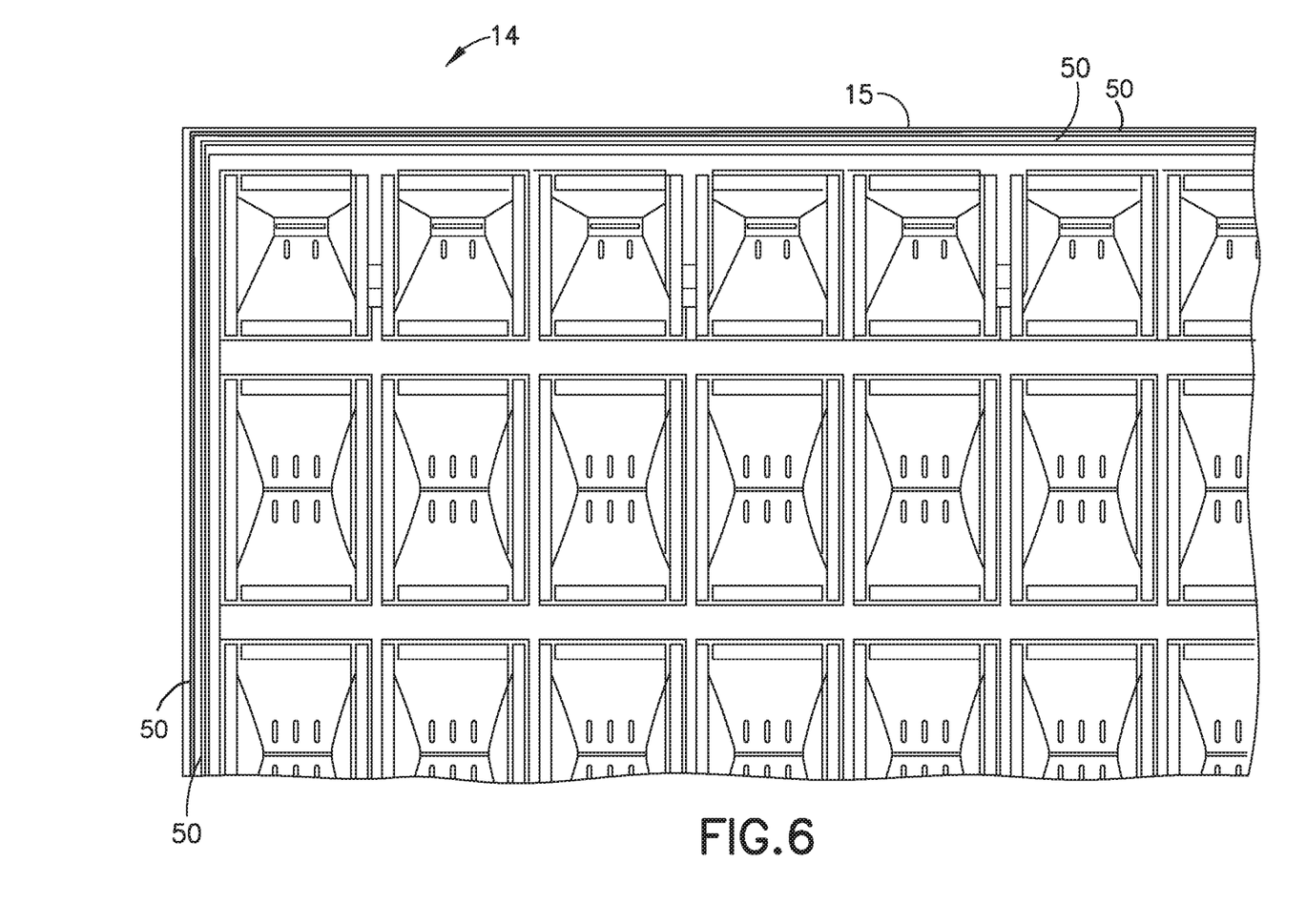
FIG. 6 is a detailed bottom view of a filter media retainer in accordance with a third embodiment of the present invention.

In accordance with another embodiment of the present invention, as shown in FIG. 6, the underdrain block 12 does not include a rib 34. Rather, the filter media retainer 14 includes a rib 50 that projects out from the bottom surface 15 of the filter media retainer 14. The rib 50 can be monolithically formed on the bottom surface 15 of the filter media retainer 14. For instance, in one embodiment, a rib 50 is monolithically formed on the bottom surface 15 of the filter media retainer 14 during the manufacturing of the filter media retainer 14.

Similar to the rib 34 of the underdrain block 12, the rib 50 of the filter media retainer 14 can project out from the bottom surface 15 about 0.01 inches to about 0.05 inches and can have a width that ranges from about 0.01 inches to about 0.05 inches. The rib 50 can also be molded into a variety of shapes including, but not limited to, a triangular shape.

In one embodiment, the rib 50 can be made of the same material as the filter media retainer 14. For instance, both the filter media retainer 14 and the rib 50 can be made of ABS. Typically, when the rib 50 is monolithically formed on the bottom surface 15 of the filter media retainer 14, the rib 50 and the filter media retainer 14 are made of the same material. In another non-limiting embodiment, the filter media retainer 14 and rib 50 are made of different materials.

The filter media retainer 14 can include a plurality of ribs 50 projecting out of the bottom surface 15. The plurality of ribs 50 can extend around a portion of the perimeter of the bottom surface 15 of the filter media retainer 14, or the plurality of ribs 50 can extend around the entire perimeter of the bottom surface 15 of the filter media retainer 14. The plurality of ribs 50 can be aligned in a consecutive row. The plurality of ribs 50 can also be a combination of intermittent ribs 50 and can be spaced apart. Alternatively, the consecutively aligned plurality of ribs 50 can be positioned such that each rib 50 abuts the next consecutive rib 50. In this embodiment, the consecutively aligned plurality of ribs 50 can form a substantially continuous barrier. In some embodiments, the plurality of ribs 50 includes combinations of continuously aligned ribs 50. Further, in certain embodiments, the plurality of ribs 50 includes a combination of intermittent and continuous sets of ribs 50. The plurality of ribs 50 can be formed in a pattern such as single or in parallel or series of parallel configurations. The plurality of ribs 50 can project out from the bottom surface 15 at the same height or at different heights ranging from 0.01 inches to 0.05 inches.

In another embodiment, the filter media retainer 14 includes one rib 50 with a length that extends around a portion of the perimeter of the bottom surface 15 of the filter media retainer 14. The filter media retainer 14 can also include a rib 50 with a length that extends around the entire perimeter of the bottom surface 15, thereby forming a barrier around the perimeter of the bottom surface 15.

When a filter media retainer 14 having a rib 50 is mounted and fastened onto an underdrain block 12, the rib 50 from the filter media retainer 14 bites into the top wall 18 of the underdrain block 12. For example, the rib 50 from the filter media retainer 14 can be made of a harder material than the underdrain block 12 so that the rib 50 bites into the top wall 18 of the underdrain block 12. This biting force from the rib 50 creates a seal between the underdrain block 12 and the filter media retainer 14. The seal formed between the underdrain block 12 and the filter media retainer 14 prevents filter media from entering the underdrain block 12. In another embodiment, the rib 50 from the filter media retainer 14 is made of a different material and will collapse or crush when the filter media retainer 14 is mounted onto an underdrain block 12, thereby creating a seal between the underdrain block 12 and the filter media retainer 14.

As described in detail above, the present invention includes a filter system 10 having at least one underdrain block 12, at least one filter media retainer 14 that is mounted onto the underdrain block 12, and a sealing rib 34, 50 positioned between the filter media retainer 14 and the underdrain block 12. During assembly, the filter media retainer 14 is mounted onto the top wall 18 of the underdrain block 12. The filter media retainer 14 can then be fastened to the underdrain block 12. For instance, the underdrain block 12 can include mounting holes positioned on the top wall 18 and the filter media retainer 14 can include fasteners that are adapted to attach to the mounting holes. Different fastening assemblies and configurations that are suitable for use with the present invention are described in U.S. patent application Ser. No. 13/553,897.

Figure 7:
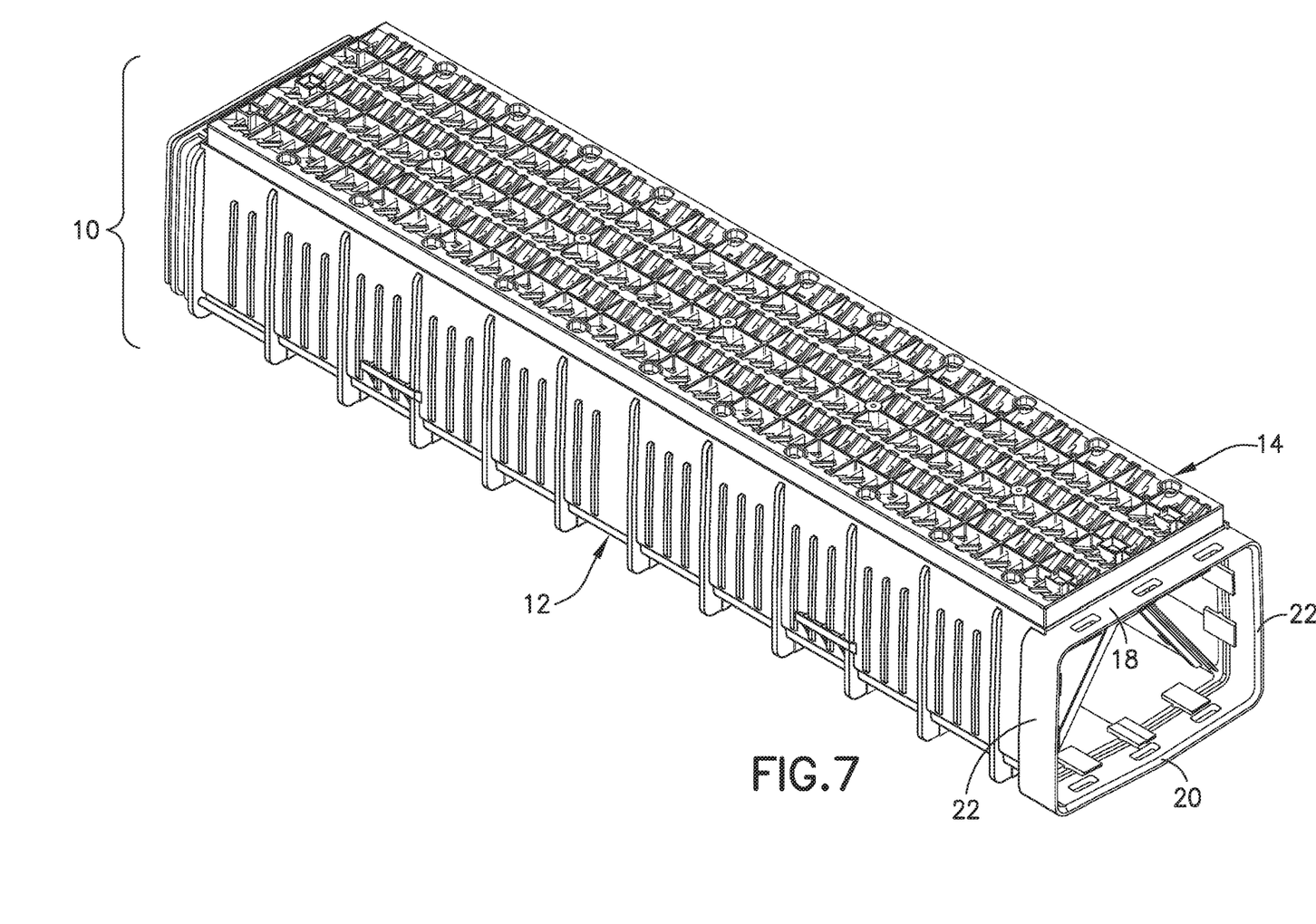
FIG. 7 is a perspective view of an assembled underdrain block and filter media retainer in accordance with the present invention.

As detailed above, the rib 34, 50 can be monolithically formed as part of the underdrain bock 12 or as part of the filter media retainer 14. The rib 34, 50 forms a sealing engagement between the underdrain block 12 and the filter media retainer 14. For example, in certain embodiments, the rib 34, 50 will collapse or crush when the filter media retainer 14 is mounted onto the underdrain block 12 creating a seal between the underdrain block 12 and the filter media retainer 14. Alternatively, in certain embodiments, the rib 34, 50 will bite into the underdrain block 12 or filter media retainer 14 when the filter media retainer 14 is mounted onto the underdrain block 12 creating a seal between the underdrain block 12 and the filter media retainer 14. After the filter media retainer 14 is sealably engaged to the underdrain block 12, filter media is placed into the filter media retainer 14. FIG. 7 illustrates an assembled filter system 10 with the filter media retainer 14 mounted to the underdrain block 12 as described herein.

During filtration, water to be filtered comes downward through granular media and passes through dispersion apertures. From there, water passes to secondary horizontal conduits 28 and then to primary horizontal conduit 26. Primary horizontal conduit 26 is connected to a collection flume (not shown), which in turn conveys the filtered liquid to a clearwell (not shown) for distribution to the consumer.

To ensure maximum filter performance, the filter media retainer 14 must be washed regularly. This is accomplished by pumping clean water back through underdrain block 12 and upward through the granular media to dislodge foreign particles from the granular media. Oftentimes, to prepare the granular media for water backwash, the submerged granular media is first scoured with an air-only backwash, wherein air is pumped upward through underdrain block 12. The air-only backwash loosens the dirt and other impurities so that they will be more easily carried off by the subsequent water backwash phase.

During the filtering and backwash processes, the seal created by the rib 34, 50 prevents filter media from passing into the underdrain block 12. Because the rib 34, 50 is already formed to the filter media retainer 14 or the underdrain block 12, the sealing process is easy, efficient, and effortless. The need to apply a sealant is reduced or eliminated altogether.

While various embodiments were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A filter system having a filter media retainer seal, the filter system comprising:
   at least one underdrain block comprising a top wall, a bottom wall, a pair of side walls extending between the top wall and the bottom wall;
   a filter media retainer mounted onto the top wall of the at least one underdrain block; and
   at least one rib positioned between the at least one underdrain block and the filter media retainer,
   wherein the at least one rib is configured to form a seal between the underdrain block and the filter media retainer, thereby preventing filter media from entering the underdrain block,
   wherein the at least one rib is monolithically formed to the at least one underdrain block, and
   wherein the at least one rib is configured to be crushed or collapsed when the filter media retainer is mounted onto the at least one underdrain block.

2. The filter system of claim 1, wherein the filter media retainer plate defines a plurality of hopper-shaped cavities for receiving particulate filter media therein and each cavity is defined by sidewalls that are slanted toward one another to form the hopper shape.

3. The filter system of claim 1, wherein the at least one rib has a triangular shape.

4. A filter system having a filter media retainer seal, the filter system comprising:
   at least one underdrain block comprising a top wall, a bottom wall, a pair of side walls extending between the top wall and the bottom wall;
   a filter media retainer mounted onto the top wall of the at least one underdrain block; and
   at least one rib positioned between the at least one underdrain block and the filter media retainer,
   wherein the at least one rib is configured to form a seal between the underdrain block and the filter media retainer, thereby preventing filter media from entering the underdrain block,
   wherein the at least one rib is monolithically formed to the at least one underdrain block and
   wherein the at least one rib collapses when the filter media retainer is mounted onto the at least one underdrain block.

* * * * *